T. F. LAWTER.
RIM EXPANDER AND LOCK.
APPLICATION FILED OCT. 18, 1920.
1,428,486.
Patented Sept. 5, 1922
2 SHEETS—SHEET 1.
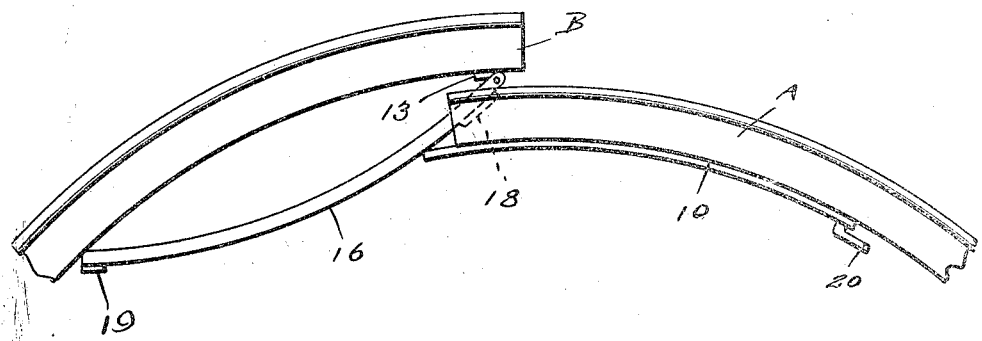
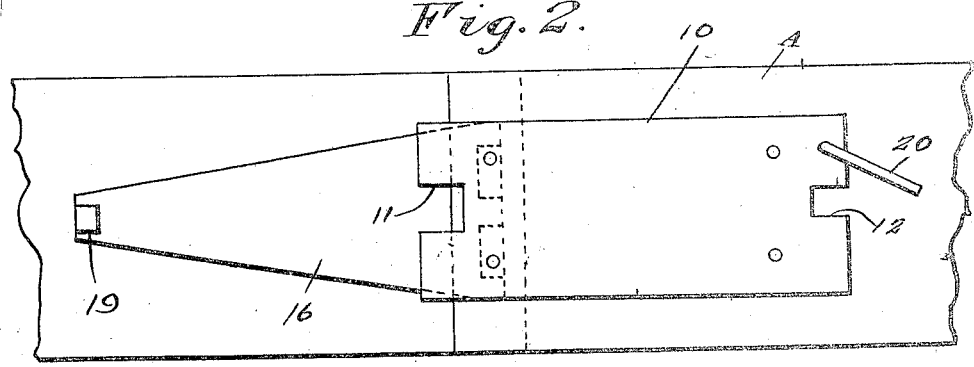
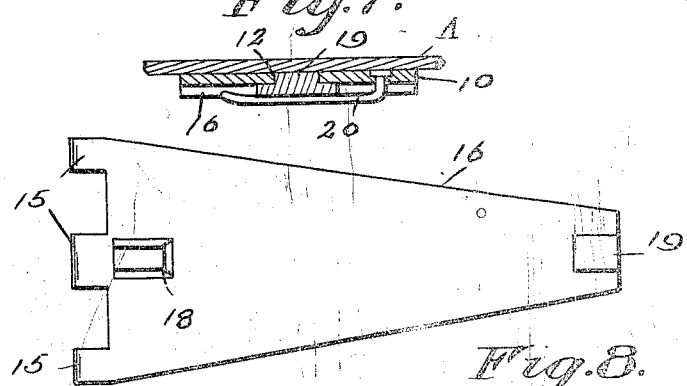

Patented Sept. 5, 1922.

1,428,486

UNITED STATES PATENT OFFICE.

THOMAS F. LAWTER, OF NEWCASTLE, INDIANA.

RIM EXPANDER AND LOCK.

Application filed October 18, 1920. Serial No. 417,613.

*To all whom it may concern:*

Be it known that I, THOMAS F. LAWTER, a citizen of the United States, residing at Newcastle, in the county of Henry and State of Indiana, have invented new and useful Improvements in Rim Expander and Locks, of which the following is a specification.

This invention relates to tire rims of the split type and has for its object the provision of novel means carried permanently by a rim of this type whereby to expand and lock the rim after it has been contracted for any reason, as in changing tires.

An important object is the provision of a device of this character which is built into and forms a part of the rim and which includes a lever which provides means for forcing the rim into expanded position.

An additional object is the provision of a device of this character which will be simple and inexpensive in manufacture, powerful in action easy to operate, efficient and durable in service, and a general improvement in the art.

With the above and other objects and advantages in view, the invention consists in the details of construction to be hereinafter more fully described and claimed and illustrated in the accompanying drawings in which—

Figure 3:
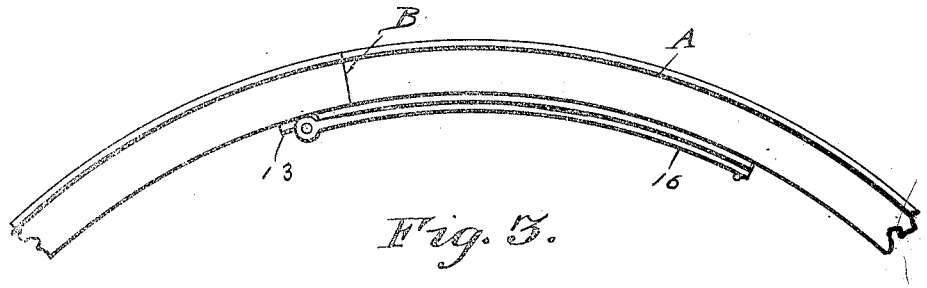
Figure 4:
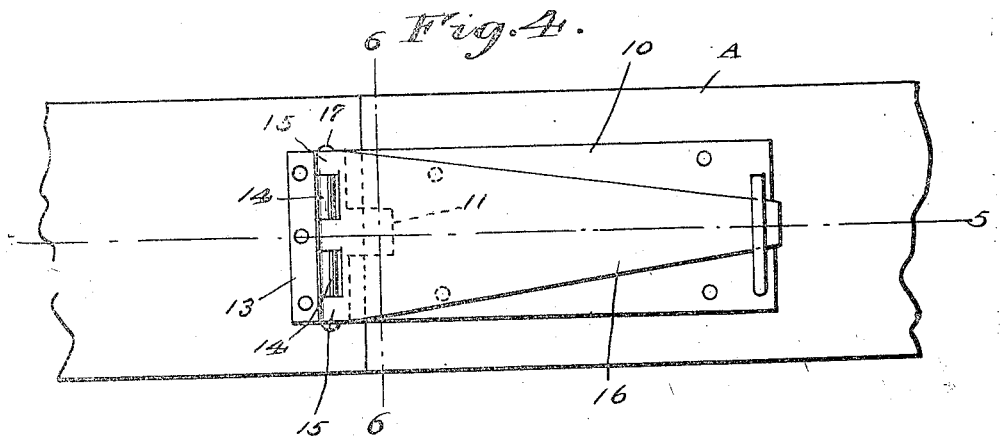
Figure 5:
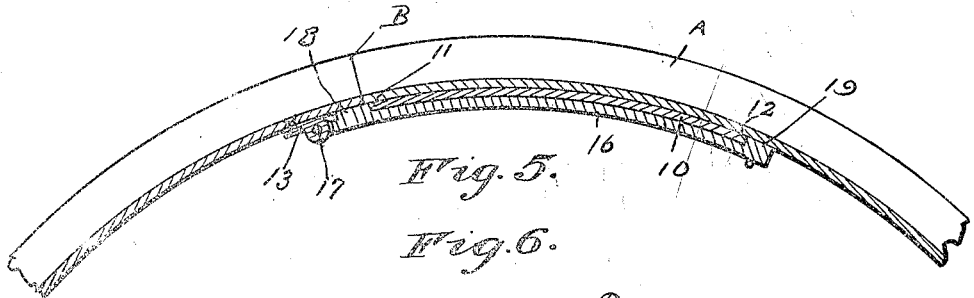
Figure 6:
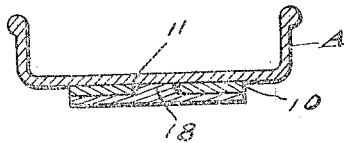

Figure 1 is a fragmentary side elevation of a rim of the split type showing my device applied thereto and in unlocked or initial position, Figure 2 is a view of the inner periphery of the rim showing the parts in unlocked position, Figure 3 is a view similar to Figure 1 showing the device in locked position, Figure 4 is a view similar to Figure 2 showing the parts locked, Figure 5 is a longitudinal sectional view on the line 5—5 of Figure 4, Figure 6 is a cross sectional view on the line 6—6 of Figure 4, Figure 7 is a cross sectional view taken through the thumb latch, and Figure 8 is a detail view of the operating lever detached.

Referring more particularly to the drawings, the letter A designates a rim which is split, as indicated at B. In carrying out my invention I provide a plate 10 which is riveted onto a rim with one end immediately adjacent the split. This end is formed with a rectangular notch 11 and the opposite end is also formed with a rectangular notch 12.

Secured upon the rim at the other side of the split is a block 13 formed with spaced upstanding ears 14 constituting knuckles and with which are engaged knuckles 15 formed with hinge leaves 16, the knuckles 14 and 15 being pivotally connected by a pintle pin 17. Formed on the leaf 16 is a lug 18 having inclined surfaces and the end portion of the leaf is formed with a lug 19 adapted to enter the recess 12. Pivoted at one side of the recess 12 is a latch 20 for a purpose to be described.

The device being constructed and assembled as above described, the operation is as follows:

Assuming that the rim has been contracted as shown in Figures 1 and 2 and that my device is in unlocked position as shown, in order to expand the rim the operator grasps the leaf 16 which thereby serves as a lever and swings it onto the plate 10. When this is done the lever 16 will engage against the projecting end of the plate member 10 and this projecting end will then serve as a fulcrum upon which the lever rocks. The leverage thus exerted tends to move the inwardly contracted end of the rim outwardly while at the same time it tends to move the outer end of the rim inwardly. When the movement is partly completed the lug 18 will engage within the notch 11 and the operation will be continued, the fulcrum point being merely shifted. This movement of the leaf 16 is continued until the leaf lies against the plate 10 with the lug 19 disposed within the recess 12. The operator then grasps the latch 20 and swings it so that it will extend across the lug 19 and consequently hold the leaf 16 associated with the plate 10. The rim will then be held firmly in its expanded position.

From the foregoing description and a study of the drawings it will be apparent that I have thus provided a very simple and consequently inexpensive rim expanding and locking means which is very easy to operate and which will be very effective in its action in every way.

While I have shown and described the preferred embodiment of my invention, it is of course to be understood that I reserve the right to make such changes in the form, construction, and arrangement of parts as will not depart from the spirit of the invention or the scope of the subjoined claim.

Having thus described my invention, I claim:

Means for expanding and locking a split rim comprising a plate secured upon the inner periphery of the rim at one side of and projecting beyond the split, said plate being formed at each end with a rectangular recess, a block secured upon the opposite side of the split, a leaf hinged upon said block and carrying a lug adapted to be engaged within the recess adjacent the split and formed at its free end with a lug engageable within the other recess, and a latch member pivoted upon the plate at the end remote from the split and engageable transversely over the leaf when the latter is swung into engagement with the plate.

In testimony whereof I affix my signature.

THOMAS F. LAWTER.